US009154481B1

(12) United States Patent
Juels et al.

(10) Patent No.: US 9,154,481 B1
(45) Date of Patent: Oct. 6, 2015

(54) DECRYPTION OF A PROTECTED RESOURCE ON A CRYPTOGRAPHIC DEVICE USING WIRELESS COMMUNICATION

(71) Applicants: Ari Juels, Brookline, MA (US); Guoying Luo, Lexington, MA (US)

(72) Inventors: Ari Juels, Brookline, MA (US); Guoying Luo, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 137 days.

(21) Appl. No.: 13/713,306

(22) Filed: Dec. 13, 2012

(51) Int. Cl.
*H04L 9/00* (2006.01)
*H04L 29/06* (2006.01)
*H04L 9/08* (2006.01)

(52) U.S. Cl.
CPC . *H04L 63/08* (2013.01); *H04L 9/08* (2013.01)

(58) Field of Classification Search
CPC .............................. H04L 9/08; H04L 9/0802
USPC ................................................ 380/277–279
See application file for complete search history.

(56) References Cited

U.S. PATENT DOCUMENTS

| | | | | |
|---|---|---|---|---|
| 7,319,759 | B1 * | 1/2008 | Peinado et al. | 380/277 |
| 8,045,715 | B2 * | 10/2011 | Kuo | 380/277 |
| 2004/0218763 | A1 * | 11/2004 | Rose et al. | 380/277 |
| 2005/0071279 | A1 * | 3/2005 | Asano | 705/57 |
| 2005/0242921 | A1 * | 11/2005 | Zimmerman et al. | 340/5.2 |
| 2007/0127719 | A1 * | 6/2007 | Selander et al. | 380/277 |
| 2007/0283154 | A1 * | 12/2007 | Zhang et al. | 713/169 |
| 2010/0043061 | A1 * | 2/2010 | Martin et al. | 726/4 |
| 2013/0182844 | A1 * | 7/2013 | Nagai et al. | 380/259 |

OTHER PUBLICATIONS

Yousuf et al., "A Survey of RFID Authentication Protocols," Advanced Information Networking and Applications—Workshops, 2008. AINAW 2008. 22nd International Conference on 2008 pp. 1346-1350.*
Khan et al., "Secure RFID Authentication Protocol with Key Updating Technique," Computer Communications and Networks (ICCCN), 2013 22nd International Conference on 2013 pp. 1-5.*
Alien Product Overview. Alien Technology Higgs 4 product overview. Whitepaper. Jul. 24, 2012.
Pete Babb. 6 cool uses of Near-Field Communication. InfoWorld, Feb. 17, 2012.
Corner et al. Zero-interaction authentication. In Proceedings of the 8th annual international conference on Mobile computing and networking, MobiCom '02, pp. 1-11, New York, NY, USA, 2002. ACM.

(Continued)

*Primary Examiner* — Roderick Tolentino
(74) *Attorney, Agent, or Firm* — Ryan, Mason & Lewis, LLP

(57) ABSTRACT

Methods, apparatus and articles of manufacture for decrypting a protected resource on a cryptographic device are provided herein. A method includes decrypting encoded information under a first cryptographic key to access a protected resource, wherein the first cryptographic key is read from a first cryptographic device subsequent to authenticating to the first cryptographic device using a first authentication key, randomly selecting a second cryptographic key, encrypting the protected resource under the second cryptographic key, and writing the second cryptographic key onto the first cryptographic device subsequent to authenticating to the first cryptographic device.

20 Claims, 7 Drawing Sheets

(56) References Cited

OTHER PUBLICATIONS

A. Juels. Strengthing EPC tags against cloning. In ACM Workshop on Wireless Security (WiSe), pp. 67-76. ACM Press, 2005.

Koscher et al. EPC RFID tags in security applications: Passport cards, enhanced drivers licenses, and beyond. In ACM CCS, pp. 33-42, 2009.

* cited by examiner

BasicMobileUnlock+

Mobile                                                        Tag $i \leftarrow t \bmod e$
for $j = 0$ to $e - 1$ $\qquad\qquad\qquad\qquad\xrightarrow{\text{read}(A_i[j];p)}$
$\qquad\qquad\qquad\qquad\xleftarrow{\kappa_i[j]}$ $\quad B_i[j] \leftarrow \kappa_i[j]$
endfor
$\kappa \leftarrow \oplus_{j=0}^{e-1} B_i[j];$
$X \leftarrow \text{decrypt}(E_i; \kappa);$ for $i = 0$ to $e - 1$
$\quad j \leftarrow (t - i) \bmod e;$
$\quad \kappa_i[j] \xleftarrow{R} K;$
$\quad B_i[j] \leftarrow \kappa_i[j]$ $\qquad\qquad\qquad\qquad\xrightarrow{\text{write}(A_i[j], \kappa_i[j];p)}$ endfor
$i \leftarrow (t + i) \bmod e;$
$\kappa \leftarrow \oplus_{j=0}^{e-1} B_i[j];$
$E_i \leftarrow \text{encrypt}(X; \kappa);$
$\text{erasekeys}(\{B_i[j]\}_{j=0}^{e-1})$

DECRYPTION OF A PROTECTED RESOURCE ON A CRYPTOGRAPHIC DEVICE USING WIRELESS COMMUNICATION

FIELD

The field relates generally to cryptography, and more particularly to security techniques for authenticating one or more users over a network or in other types of communication systems.

BACKGROUND

In many applications, it is desirable for one computer, server, mobile telephone, radio-frequency identification (RFID) tag or other type of cryptographic device to pair with, authenticate or otherwise share secrets with another cryptographic device. Unfortunately, such arrangements can be problematic when carried out using existing techniques.

RFID is a catchall term for a range of technologies that perform short-to-medium range wireless communication, typically between a well-resourced reader and a highly-constrained device referred to as a tag. Near-field communication (NFC) is a specialization of RFID directed to a particular set of radio frequencies and protocol standards, and is designed for near-contact communication. NFC is also an extension of RFID that permits reader-to-reader networking.

Mobile devices, particularly handsets, are increasingly outfitted with NFC readers. Objectives for the inclusion of NFC readers on such devices include permitting such devices to act as contactless payment devices, ticketing devices, interactive posters, etc. Also, as tags are compact and easily carried by users, they are becoming attractive as factors for the release of credentials on mobile devices. For instance, consider the following example.

A user, referred to in this example as Alice, runs a software-based password authentication product on her mobile handset. She also keeps an NFC tag attached to a monitor on the desk of her office. Rather than typing her personal identification number (PIN) into her mobile handset to authenticate using the password authentication product, she physically taps her phone against the NFC tag. When she does so, her PIN is automatically instantiated in the software-based password authentication product on her mobile handset.

Special-purpose, cryptographically-enabled tags can be designed to support this mode of use. However, conventional or general-purpose tags, both with and without cryptography, cannot accomplish such objectives. Accordingly, a need exists to provide capabilities for storing a key on a conventional or general-purpose tag that can serve to decrypt a credential on a mobile device.

SUMMARY

One or more illustrative embodiments of the present invention provide techniques for decrypting mobile device credentials with use of a general-purpose RFID/NFC tag. In accordance with an aspect of the invention, a method is provided and comprises the steps of: decrypting encoded information under a first cryptographic key to access a protected resource, wherein the first cryptographic key is read from a first cryptographic device subsequent to authenticating to the first cryptographic device using a first authentication key, randomly selecting a second cryptographic key, encrypting the protected resource under the second cryptographic key, and writing the second cryptographic key onto the first cryptographic device subsequent to authenticating to the first cryptographic device.

In another aspect of the invention, a method is provided and comprises the steps of: selecting a first cryptographic key from a first set of cryptographic keys on a first cryptographic device, wherein each cryptographic key includes one or more sub-keys, decrypting encoded information under the first cryptographic key to access a protected resource, wherein said decrypting comprises receiving the selected first cryptographic key from the first cryptographic device, and generating a set of sub-keys for use in updating the first set of cryptographic keys. The method additionally includes selecting a second cryptographic key from the first set of cryptographic keys, said second cryptographic key including at least one sub-key from the generated set of sub-keys and at least one pre-existing sub-key, encrypting the protected resource under the second cryptographic key and/or a key related to the second cryptographic key, and transmitting the generated set of sub-keys to the first cryptographic device.

The decryption techniques of the illustrative embodiments overcome one or more of the problems associated with the conventional techniques described previously, and provide decryption of a credential on a device via use of a stored key on a general-purpose RFID/NFC tag. These and other features and advantages of the present invention will become more readily apparent from the accompanying drawings and the following detailed description.

BRIEF DESCRIPTION OF THE DRAWINGS

FIG. 3 is a diagram illustrating an example decryption protocol, according to an embodiment of the invention;

DETAILED DESCRIPTION

Figure 1:
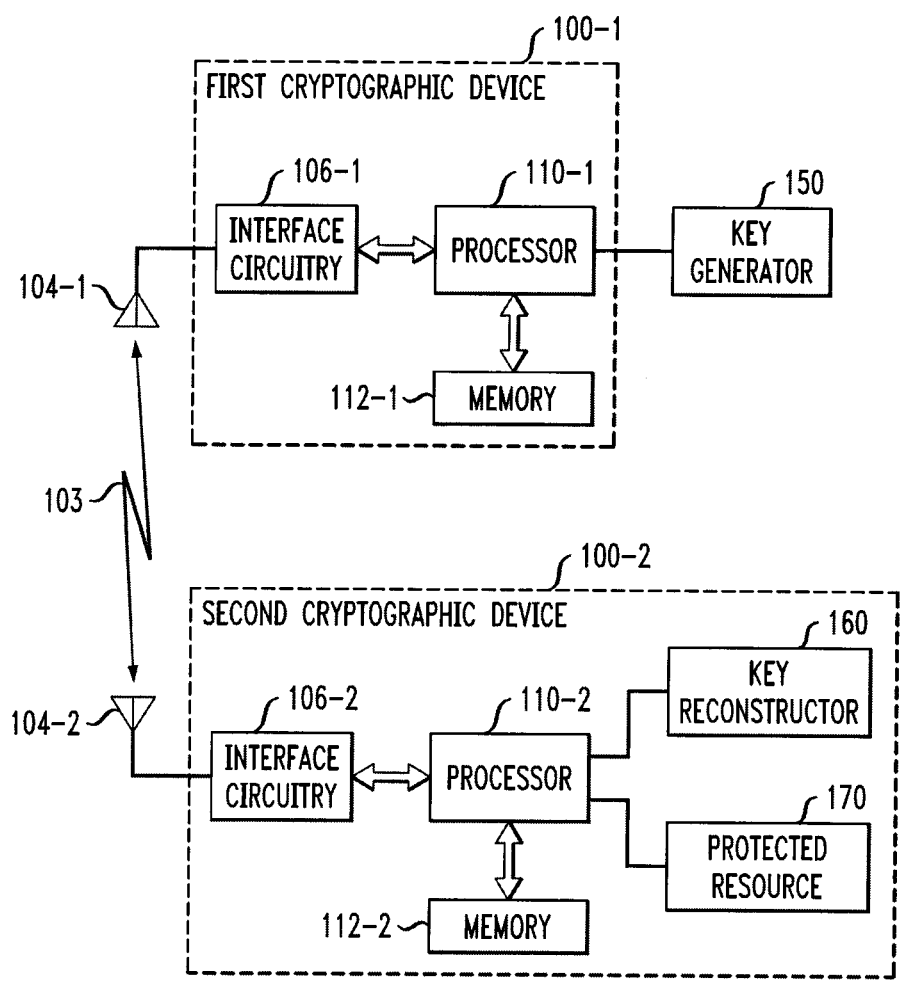
FIG. 1 is a block diagram of an authentication system comprising multiple cryptographic devices in an example embodiment of the invention.

As will be described, the present invention, in one or more illustrative embodiments, provides techniques for unlocking RFID- and/or near-field communication (NFC)-enabled mobile device credentials with the assistance of general-purpose RFID and/or NFC tags. Such techniques can include storing a key on a tag, wherein the key serves to decrypt a credential on a mobile device during a session. As used, herein, a "key" can encompass any information (for example, secret information) used in a cryptographic operation. As further detailed herein, in at least one embodiment of the invention, such a key stored on a tag can itself be protected using a secret or password stored on the mobile device.

Illustrative embodiments of the present invention will be described herein with reference to exemplary communication systems and associated processing devices. It is to be appreciated, however, that the invention is not restricted to use with the particular illustrative system and device configurations shown. For example, while illustrative embodiments detailed herein may describe a tag as a single device, it should be appreciated that a mobile device can support the use of multiple, independently-keyed tags simultaneously.

Additionally, the term "communication system," as used herein, is intended to be broadly construed so as to encompass any type of system in which multiple processing devices can communicate with one another. Also, the term "cryptographic device," as used herein, is intended to be construed broadly so as encompass any type of processing device that incorporates cryptographic functionality and/or storage of information used in connection with a cryptographic operation (such as a computer, server, mobile telephone, RFID/NFC tag or reader, authentication token, etc.). Similarly, the term "authentication server" should be understood to encompass any type of processing device or set of such devices that is operative to authenticate a passcode provided by an authentication token or other type of cryptographic device. As used herein, an "authentication server" need not be a network-based server, and may be implemented as a portion of a device that performs other functions, as a combination of multiple servers or other devices, or in other forms.

Additionally, the term "authentication information," as used herein, is intended to include passwords, passcodes, answers to life questions, or other authentication credentials, or values derived from such authentication credentials, or more generally any other information that a user may be required to submit in order to obtain access to an access-controlled application. Similarly, the term "passcode," as used herein, is intended to include authentication information such as one-time passcodes (OTPs), or more generally any other information that may be utilized for cryptographic authentication purposes.

Further, the term "mobile device," as used herein, refers generally to denote any NFC and/or RFID-enabled device; typically, but not necessarily, a mobile telephone device. Similarly, the term "tag," as used herein, refers to a subsidiary device used for credential release on a separate device (such as a mobile device). In one or more embodiments of the invention, a tag is typically an RFID and/or NFC tag.

FIG. 1 shows an exemplary authentication system corresponding generally to an implementation of a system which comprises a first cryptographic device 100-1 and a second cryptographic device 100-2. In this embodiment, the cryptographic devices 100-1 and 100-2 communicate with one another over a wireless channel 103 using respective antennas 104-1 and 104-2 and respective interface circuitry 106-1 and 106-2. Each of the cryptographic devices 100 further comprises a processor 110 coupled to a memory 112. In at least one example embodiment of the invention, the first cryptographic device 100-1 is a general-purpose RFID and/or NFC tag, and the second cryptographic device is an NFC and/or RFID-enabled mobile device (such as a smart phone, a mobile handset, etc.).

As described herein, the first cryptographic device 100-1 can store a secret value in the form of a key. For example, the key may be a particular key from a set of keys generated by a key generator component 150 independent of the first cryptographic device 100-1. Additionally, as further detailed herein in connection with at least one embodiment of the invention, the key generated by key generator 150 and stored in the first cryptographic device 100-1 is used to access a protected resource 170 in the second cryptographic device. By way of example, the protected resource 170 can be a credential on the second cryptographic device 100-2, and the first cryptographic device 100-1 can use the stored key to decrypt that credential.

It is to be appreciated that a given embodiment of the disclosed system may include multiple instances of first cryptographic device 100-1, second cryptographic device 100-2 and key generator 150, and possibly other system components, although only single instances of such components are shown in the simplified system diagram of FIG. 1 for clarity of illustration.

Further, as used herein, the term "session" with a cryptographic device or a protected resource 170 thereof shall mean an interactive information interchange between a first cryptographic device and the protected resource 170 (or a second cryptographic device within which the protected resource is contained).

The key generator 150 is shown in FIG. 1 as being separate from and electrically connected to the first cryptographic device 100-1. The key generator 150 may be a server or other type of module that is accessible over a network, or it may be a software component resident on the first cryptographic device 100-1. As another alternative, key generator 150 may be distributed over multiple devices, one of which may be the first cryptographic device 100-1.

Accordingly, while at least one embodiment of the present invention is illustrated herein using a key generator 150 electrically connected to the first cryptographic device 100-1, such that the first cryptographic device 100-1 can read a given key (or another authentication value) directly from the key generator 150, other implementations are within the scope of the present invention, as would be apparent to a person of ordinary skill in the art.

The wireless channel 103 between the cryptographic devices 100-1 and 100-2 in at least one embodiment of the invention may be configured to utilize a short-range wireless communication protocol, such as Bluetooth, ZigBee, IEEE 802.11, NFC, RFID, wireless sensors, etc. It is to be appreciated, however, that other types of wireless communication protocols may be used in other embodiments.

Such an arrangement ensures that the second cryptographic device 100-2 must be in wireless contact with the first cryptographic device 100-1 for at least a designated minimum amount of time in order to receive the designated minimum number of portions required to determine the secret value. For example, the second cryptographic device 100-2 may be required to remain in continuous radio contact with the first cryptographic device 100-1 for the designated minimum amount of time, or may be required to have a sufficient number of non-continuous radio contacts that collectively meet the designated minimum amount of time. Numerous other alternatives for satisfying radio contact for the designated minimum amount of time may be used.

This type of required minimum duration of radio contact can be difficult for an adversary to achieve, and therefore provides security within the system. By way merely of example, a tag in a user's home would be able to pair with a reader in the home overnight, while a maliciously operated reader in a commuter bus (that is, a bus passing the user's home) likely would not have sufficient time to harvest the secret key from the tag.

As detailed herein, embodiments of the invention may be configured to operate such that the first cryptographic device 100-1 could transmit symbols from a cryptographic key, and also transmit a value derived from the key, for example, a digest. The second cryptographic device 100-2 would utilize the digest and a minimum number of received symbols to recover missing symbols of the key via key reconstructor 160.

Also, for example, the first cryptographic device 100-1 can transmit full keys to the second cryptographic device 100-2. These full keys can be composed, for example, via a XOR function, into a single, composite key, which may be used to encrypt or decrypt using standard algorithms.

It should be emphasized that the above is only an example, and numerous other arrangements may be utilized in other embodiments.

Cryptographic device elements such as interface circuitry 106, processor 110, memory 112 and one or more of the other functional modules of the cryptographic devices 100 may be implemented in whole or in part in the form of one or more integrated circuits.

By way of example, the interface circuitry 106 may comprise conventional transceivers of a type well known in the art, and the processor 110 may comprise a microprocessor, a microcontroller, an application-specific integrated circuit (ASIC), a field programmable gate array (FPGA) or other type of processing circuitry, as well as portions or combinations of such circuitry elements.

The memory 112 may be viewed as an example of what is more generally referred to herein as a "computer program product" or an "article of manufacture" having executable computer program code embodied therein. Such a memory may comprise electronic memory such as random access memory (RAM), read-only memory (ROM) or other types of memory, in any combination. The computer program code embodied in the memory 112 when executed by the processor 110 causes the corresponding cryptographic device to perform functions associated with the techniques detailed herein. One skilled in the art would be readily able to implement such software given the teachings provided herein. Other examples of computer program products embodying aspects of the invention may include, for example, optical or magnetic disks, or other storage devices, or suitable portions or combinations of such devices. In addition to storing computer program code, such storage devices will also generally be used to store data within the authentication system.

Other device elements may be implemented at least in part in the form of software stored in the corresponding memory 112 and executed by the corresponding processor 110. One or more of these elements alternatively may be implemented using a combination of hardware, software and firmware.

Accordingly, as detailed herein, at least one embodiment of the invention includes deploying and/or employing an RFID/NFC tag as an independent security factor to unlock mobile device credentials. Further, aspects of the invention include consideration of two tag types: (1) tags with password-based access control on data contents, but no cryptography; and (2) cryptographically-enabled tags that perform challenge-response authentication. One or more embodiments of the invention can include providing schemes that work in case (2) even when tag keys are not available at the time of provisioning of the mobile device.

By way of example, electronic product code (EPC) tags are among the least expensive and most widely deployed RFID tags. EPC tags generally do not perform cryptography and are consequently vulnerable to cloning attacks. However, EPC tags generally do have an optional, widely available access control feature that requires use of a (typically) 32-bit PIN to read and write to sensitive memory locations. NFC tags often have similar password protections on sensitive memory.

An authentication scheme for such tags is disclosed in A. Juels., "Strengthening EPC tags against cloning," *ACM Workshop on Wireless Security* (*WiSe*), pages 67-76. ACM Press, 2005, which is incorporated by reference herein. In the authentication scheme, a key κ is stored on a tag protected with a password or PIN p. To authenticate the tag, a trusted entity with knowledge of (p, κ) unlocks the tag memory using p and confirms the presence of κ.

To minimize the impact of eavesdropping attacks, it is possible to store at least two secrets on the tag. By reading just one secret per session, the mobile device can reduce exposure of tag-side secrets to an eavesdropping attacker.

As described herein, at least one embodiment of the invention includes using a key κ not to authenticate a tag, but instead to unlock a credential on a mobile device. Additionally, in one or more embodiments of the invention, a tag can store multiple keys and a mobile device can rotate between these keys over time (as well as rotate between passwords p, if desired).

By way of illustration, consider the following. Suppose that a tag has q memory locations, indexed by $Z_q$. Let K denote a key space, for example, $\{0, 1\}^{128}$ when a key κ is 128 bits in length. Similarly, let P denote a password space for p, and let κ[i] denote the memory contents of location i.

Additionally, in at least one embodiment of the invention (and in connection with the protocols depicted in FIGS. 2-4), the following functions on a tag are assumed:

read(i; p) denotes a command to read tag memory location i using password p;

write(m, i; p) is a command to write message m to location i using password p; and change(p'; p) is a command to change password p top'.

Further, in at least one embodiment of the invention (and also in connection with the protocols depicted in FIGS. 2-4), the following functions on a mobile device are assumed:

erasekeys (•) denotes secure erasure of all specified keys in the local memory;

encrypt(X; κ) performs (symmetric-key, authenticated) encryption of a message and/or credential X under key κ; and decrypt(X; κ) performs the corresponding decryption operation.

The credential (or protected resource) X, by way of example, can be a password, a decryption key, an authentication key, etc.

Figure 2:
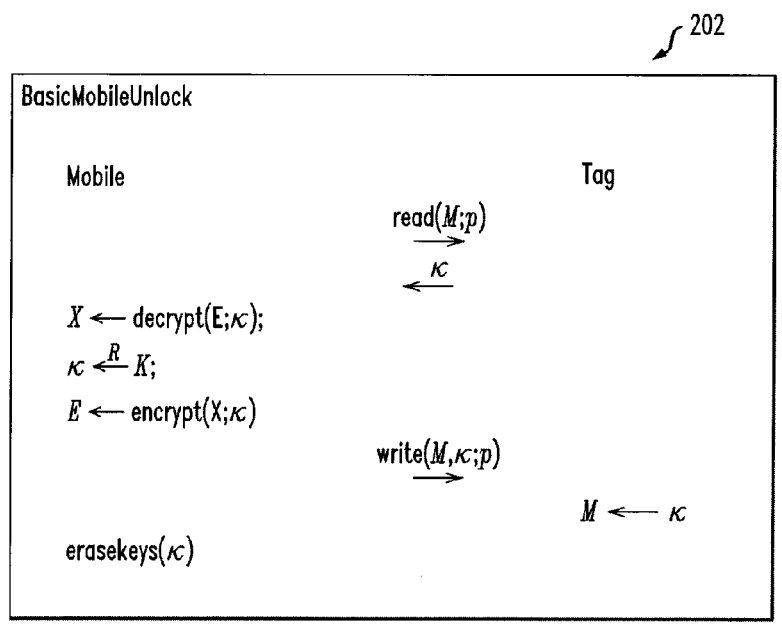
FIG. 2 is a diagram illustrating an example decryption protocol, according to an embodiment of the invention.

FIG. 2 is a diagram illustrating an example decryption protocol (identified as BasicMobileUnlock) 202, according to an embodiment of the invention. Specifically, FIG. 2 depicts a scheme to unlock X on a mobile device with the help of a tag, and also enforce key rotation.

As detailed in FIG. 2, M represents a memory location on the tag sufficient to store a key κ. At the end of the protocol, the mobile device changes p to a new, randomly selected password p' by transmitting to the tag the command change (p'; p).

FIG. 3 is a diagram illustrating a second example decryption protocol (identified as BasicMobileUnlock+) 302, according to an embodiment of the invention. Let t denote time, in the sense that it represents the total number of tag-mobile device sessions. To protect against a single-session eavesdropping attack, the mobile device can encrypt X in a session with the tag at time t under a key that is not exposed (that is, read from or written to the tag, at time t). One way to accomplish this goal is for the mobile device to store encryption keys locally. These keys can be symmetric keys that are deleted immediately from the mobile device after their use for encryption, or public keys whose corresponding private-key seeds are stored on the tag.

Accordingly, FIG. 3 specifies a scheme that protects against eavesdropping attacks by an adversary prior to compromise of the mobile device. By way of illustration, consider the following.

There is a set of e keys $\kappa_0, \ldots, \kappa_{e-1}$. Each key is composed of a set of sub-keys $\kappa_i[0], \ldots, \kappa_i[e]$. In particular, $\kappa_i = \bigoplus_{j=0}^{e-1} \kappa_i[j]$, for some operator $\oplus$ (for example, XOR).

The mobile device randomizes each of the sub-keys for key $\kappa_i$, in sequence, across t time-steps. Further, the mobile device stores the sub-keys locally and also writes the sub-keys to the tag as the sub-keys are generated. When the mobile device has randomized $\kappa_i[e]$, that is, the last sub-key, the mobile device encrypts $\kappa_i$ under as ciphertext $E_i$ and erases all sub-keys. In the next time-step, the mobile device reads all sub-keys from the tag to decrypt $E_i$ and recover X.

In order to decrypt $E_1$ upon compromising the mobile device, an attacker or adversary must have recovered all sub-keys across the e previous sessions between the mobile device and the tag, wherein e represents the number of keys in the scheme.

In an example embodiment of the invention, in each time-step, exactly one key $\kappa_i$ is decrypted and another, distinct key $\kappa_{(i+1) \mod e}$, is encrypted. Thus, X is always available for use on the mobile device when the mobile device communicates with the tag.

The scheme depicted in FIG. 3 requires $e^2$ memory locations on the tag, each capable of storing a single key. Additionally, let $A_i[j]$ and $B_i[j]$ denote arrays of keys for i, j, $\epsilon$, $Z_e$, respectively, on the tag and the mobile device. At the end of the protocol depicted in FIG. 3, the mobile device also changes p to a new, randomly selected password p' by transmitting to the tag the command change (p'; p).

Additionally, a public-key variant to at least one embodiment of the invention is possible in which the $i^{th}$ key is a private/public key pair ($SK_i$, $PK_i$). In this case, $\kappa_i$ is a seed for the generation of $SK_i$. At the time t that $\kappa_i$ is fully determined, that is, all sub-keys have been computed, the public key $PK_i$ is derived from $\kappa_i$ (by way of $SK_i$), and credential $E_i = enc_{PKi}$ [X] is computed. At time t+1, the sub-keys for are collected, and $\kappa_i$ is used to compute $SK_i$ and decrypt $E_1$ to obtain X. This variant offers some resistance to transient compromise of the mobile device, and also has the advantage of allowing the mobile device to change X without communicating with the tag. In particular, if $PK_i$ is retained between times t and t+1, X can be changed and re-encrypted by the mobile device.

An active attack that includes eavesdropping and modifying messages on the channel between the mobile device and the tag can attempt to mount a denial-of service attack by corrupting keys and preventing the mobile device from decrypting ciphertexts on X. However, at least one embodiment of the invention includes encrypting X additionally under an "emergency" key available without the presence of the tag. By way of example, X might be encrypted (or "escrowed") under the public key of a trusted entity, or under a public key whose corresponding private key is derived from a user password.

Figure 4:
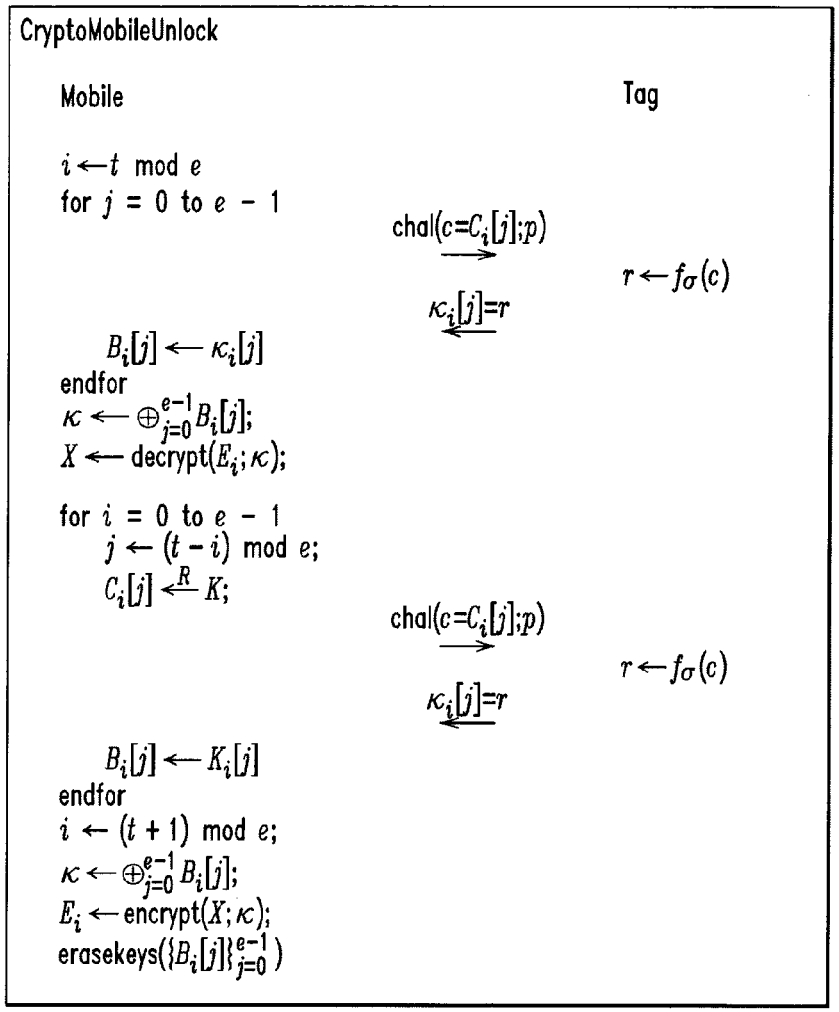
FIG. 4 is a diagram illustrating an example decryption protocol, according to an embodiment of the invention.

FIG. 4 is a diagram illustrating an example decryption protocol (identified as CryptoMobileUnlock) 402, according to an embodiment of the invention. The protocol depicted in FIG. 402 pertains to cryptographically-enabled tags. Particularly, protocol 402 considers a case where the tag performs challenge-response authentication, but the mobile device does not have access to the tag's key. The tag, in this case, stores a secret key $\sigma$. When it receives a challenge c$\epsilon$K, the tag transmits the response r=$f(\sigma, c)\epsilon$K for some function $f$ (for example, a cryptographic hash function). By way of example, some EPC tags perform challenge-response using an undisclosed function $f$ that may or may not be cryptographically secure. However, protocol 402 depicted in FIG. 4 remains applicable.

Accordingly, let chal(c) denote the command that sends a challenge to the tag. Also, intuitively, a challenge c[i] may be thought of as defining a virtual memory location i on the tag.

Additionally, at least one embodiment of the invention includes creating a scheme that is resistant to eavesdropping at the expense of an extended initialization period, as the tag does not require any extra storage for an unlocking scheme as described above. For this purpose, the mobile device can initialize $\{C_i[0]\}_{i=1}$ with random challenge values for some n large enough to exceed the total number of mobile device-tag sessions. The mobile device can further interrogate to obtain the corresponding responses for all of these challenges, and can encrypt X under each of them.

More precisely, let $\kappa_i = f(C_i[0])$. The mobile device computes and stores $\{E_i = encrypt(X; \kappa_i)\}_{i=1}^n$. To decrypt X, the mobile device recovers $\kappa_i$ by sending challenge $C_i[0]$ to the tag.

Additionally, a public-key variant of this scheme allows X to be updated by the mobile device without communicating with the tag.

The scheme described above in connection with FIG. 4 is also suitable for cases in which, upon provisioning of the mobile device, the secret key of the tag is available. In that case, the tag need not be queried. Ciphertexts can be computed directly from the tag's key.

Figure 5:
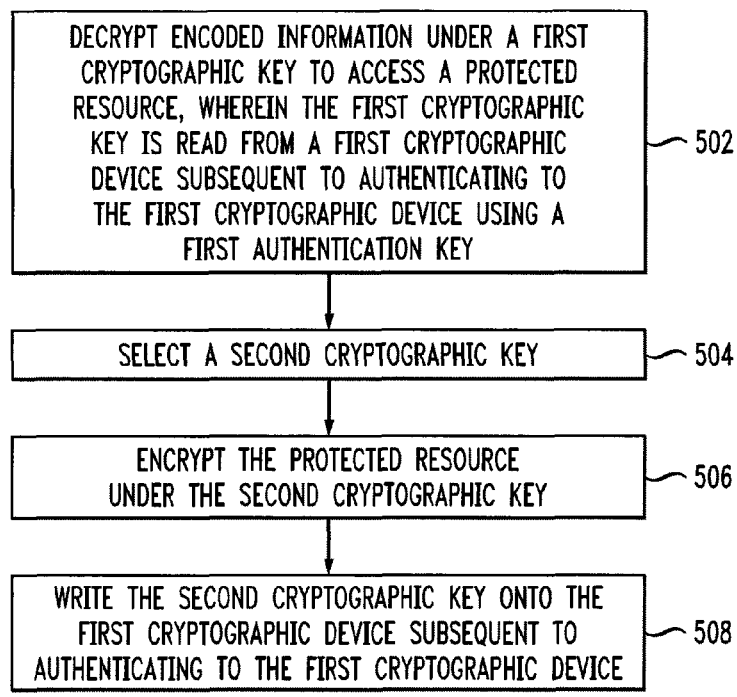
FIG. 5 is a flow diagram illustrating techniques for decrypting a credential on a cryptographic device using a general-purpose RFID and/or NFC tag, according to an embodiment of the invention.

FIG. 5 is a flow diagram illustrating techniques for decrypting a credential on a cryptographic device using a general-purpose RFID and/or NFC tag, according to an embodiment of the invention. Step 502 includes decrypting encoded information under a first cryptographic key to access a protected resource, wherein the first cryptographic key is read from a first cryptographic device subsequent to authenticating to the first cryptographic device using a first authentication key. As described herein, the first cryptographic device can include a (wireless) radio-frequency identification tag and/or a near-field communication tag.

Step 504 includes selecting (for example, randomly selecting) a second cryptographic key. In at least one embodiment of the invention, the first cryptographic key can include a first secret key shared between the first cryptographic device and a second cryptographic device, and the second cryptographic key can include a second secret key shared between the first cryptographic device and the second cryptographic device.

Step 506 includes encrypting the protected resource under the second cryptographic key. Step 508 includes writing the second cryptographic key onto the first cryptographic device subsequent to authenticating to the first cryptographic device. Writing the second cryptographic key onto the first cryptographic device can include writing the second cryptographic key onto the first cryptographic device subsequent to authenticating to the first cryptographic device using the first authentication key.

Additionally, in at least one embodiment of the invention, writing the second cryptographic key onto the first cryptographic device can include writing the second cryptographic key onto the first cryptographic device subsequent to authenticating to the first cryptographic device using a second authentication key. By way of example, the first authentication key can include a first password, and the second authentication key can include a second password.

The protected resource can include, for example, a password, a decryption key and/or an authentication key. Further, as detailed herein, the protected resource is stored on a second (wireless) cryptographic device such as, for example, a mobile device.

Figure 6:
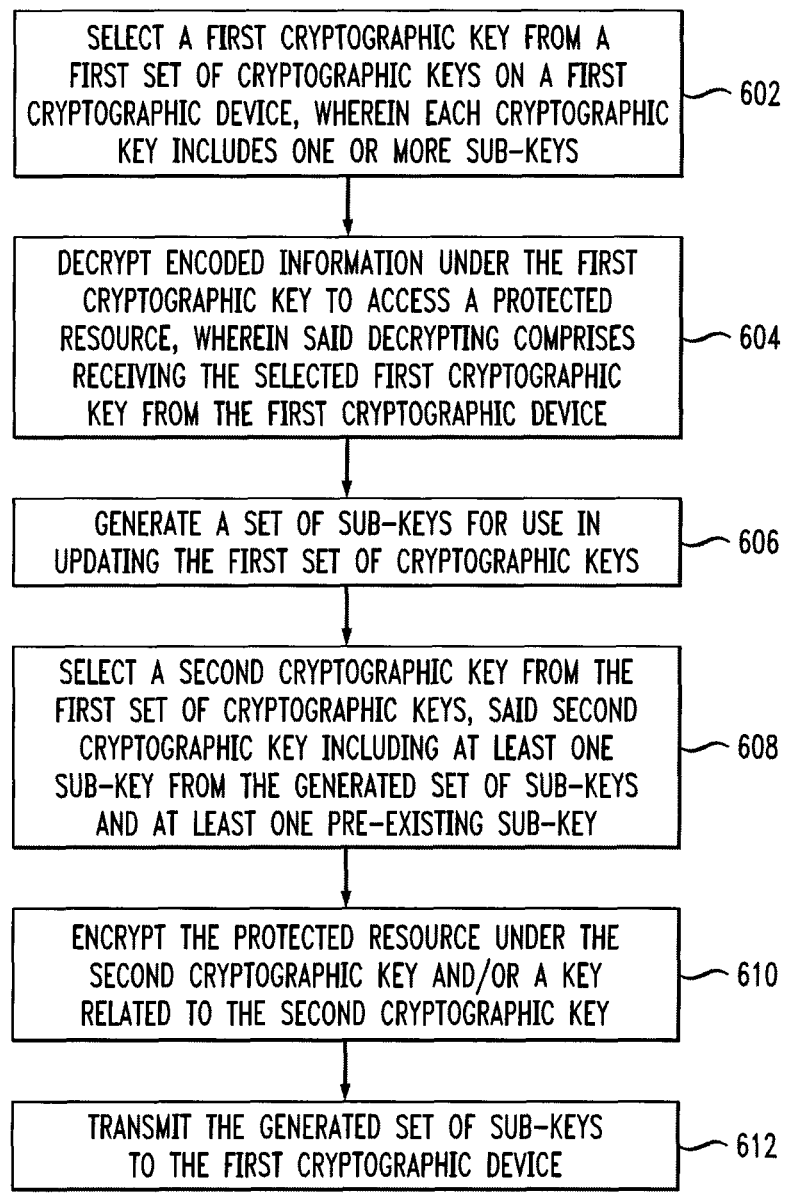
FIG. 6 is a flow diagram illustrating techniques for decrypting a credential on a cryptographic device, according to an embodiment of the invention.

FIG. 6 is a flow diagram illustrating techniques for decrypting a credential on a cryptographic device, according to an embodiment of the invention. Step 602 includes selecting a first cryptographic key from a first set of cryptographic keys on a first cryptographic device, wherein each cryptographic key includes one or more sub-keys. The first cryptographic device can include an RFID tag or an NFC tag and/or a storage device. Also, as described herein, the first set of cryptographic keys can include a set of multiple secret keys shared between the first cryptographic device and a second cryptographic device (for example, a mobile device).

Step 604 includes decrypting encoded information under the first cryptographic key to access a protected resource, wherein said decrypting comprises receiving the selected first cryptographic key from the first cryptographic device. As detailed herein, to decrypt, all of the constituent sub-keys of the first cryptographic key (for example, a decryption key) in current use are read from the first cryptographic device. All sub-keys for that key are then rendered null (for example, erased or simply never used again). Accordingly, the number of fresh or unused sub-keys in this first cryptographic key will then equal 0. In the other keys from the first set of cryptographic keys, the number of fresh or unused sub-keys will range from 1 to e−1, wherein e represents the number of keys in the scheme.

Step 606 includes generating a set of sub-keys for use in updating the first set of cryptographic keys. In an example embodiment of the invention, a fresh sub-key is generated for each of the e keys remaining in the scheme (and each such sub-key is written to the first device). Additionally, in at least one embodiment of the invention, the sub-keys are maintained locally on the generating device (for example, a mobile device). The sub-keys can also be randomized, such as detailed herein. Accordingly, in such an embodiment, the number of fresh sub-keys at this point ranges from 1 to e.

Further, in at least one embodiment of the invention, the first cryptographic device can aggregate sub-keys.

Step 608 includes selecting a second cryptographic key from the first set of cryptographic keys, said second cryptographic key including at least one sub-key from the generated set of sub-keys and at least one pre-existing sub-key. The key with e fresh sub-keys is complete and ready for use. That key can be used to perform encryption, and its constituent sub-keys would subsequently be removed from the generating device. Additionally, a key related to the second cryptographic key can include a public key that corresponds to the second cryptographic key, wherein the second cryptographic key is a private key. As such, at least one embodiment of the invention can incorporate a public-key encryption scheme.

Step 610 includes encrypting the protected resource under the second cryptographic key and/or a key related to the second cryptographic key. Step 612 includes transmitting the generated set of sub-keys to the first cryptographic device. Accordingly, as detailed in connection with the techniques depicted in FIG. 6, each sub-key is used in only one operation of encryption or decryption.

The techniques depicted in FIG. 6 can also include incorporating authenticating to the first cryptographic device using authentication information such as passwords.

Authentication techniques of the type described herein may be implemented in a wide variety of different applications. Two additional exemplary communication system applications that may incorporate the detailed decryption techniques will now be described with reference to FIGS. 7 and 8.

Figure 7:
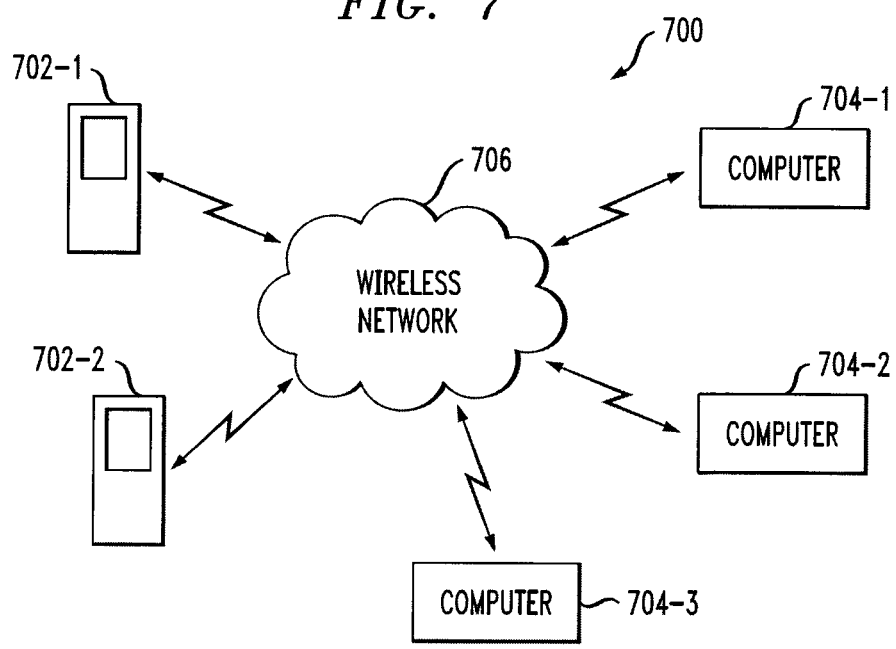
FIGS. 7 and 8 show exemplary embodiments of other communication systems that may incorporate decryption functionality of the type illustrated in FIGS. 5 and 6.

FIG. 7 depicts a communication system 700 comprising a plurality of mobile devices 702-1 and 702-2 and computer devices 704-1, 704-2 and 704-3, configured to communicate with one another over a network 706.

Any two or more of the devices 702 and 704 may correspond to respective first and second cryptographic devices (100-1 and 100-2 as depicted in FIG. 1) configured to implement the decryption techniques as described herein.

Figure 8:
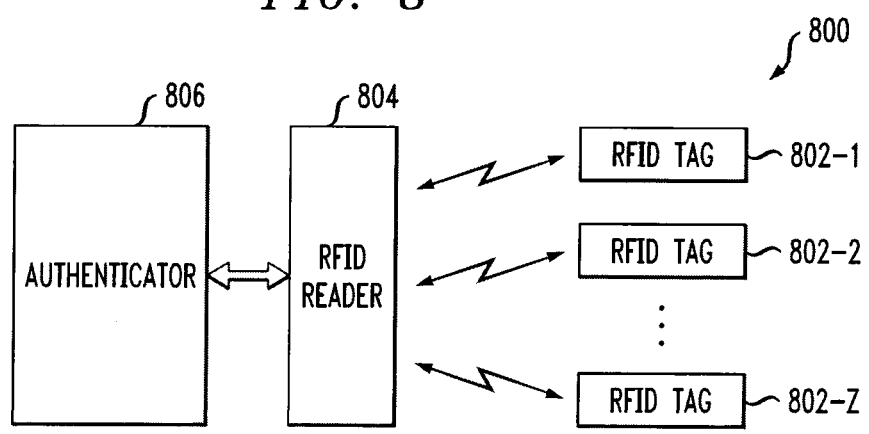

FIG. 8 shows another exemplary communication system 800 in an illustrative embodiment of the invention. In this embodiment, the system 800 is an RFID system (or an NFC system) comprising RFID tags (or NFC tags) 802-1, 802-2, ... 802-Z, a reader 804, and an authenticator 806. In at least one embodiment of the invention, one or more of the RFID tags 802 may correspond to the first cryptographic device, and the reader 804, possibly in combination with the authenticator 806, may correspond to the second cryptographic device. The authenticator 806 may represent, for example, a back-end authentication server configured to authenticate secret values supplied to it by one or more of the RFID tags 802 via the reader 804. The system 800 may be configured such that epochs for authentication of one or more of the RFID tags 802 are adjustable responsive to epoch control signals from the reader 804 or authenticator 806.

It is to be appreciated that the techniques disclosed herein can be implemented in numerous other applications.

It should again be emphasized that the above-described embodiments of the invention are presented for purposes of illustration only. Many variations and other alternative embodiments may be used. For example, the techniques are applicable to a wide variety of other types of communication systems and cryptographic devices that can benefit from implementing a key stored on a RFID tag to decrypt a credential on a mobile device. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:

decrypting encoded information under a first cryptographic key from a collection of multiple cryptographic keys on a first cryptographic device to access a protected resource, wherein the first cryptographic device comprises one of a radio-frequency identification tag and a near-field communication tag, wherein each cryptographic key in the collection is associated with one or more sub-keys, and wherein the first cryptographic key is read from the first cryptographic device subsequent to authenticating to the first cryptographic device by (i) reading all of the one or more sub-keys associated with the first cryptographic key from the first cryptographic device and (ii) matching all of the one or more sub-keys associated with the first cryptographic key to one or more maintained sub-keys;

rendering null all of the one or more sub-keys associated with the first cryptographic key;

erasing the first cryptographic key;

transmitting, to the first cryptographic device, a command to modify each of the one or more sub-keys associated with each remaining cryptographic key in the collection of cryptographic keys;

selecting a second cryptographic key from the collection of multiple cryptographic keys on the first cryptographic device; and encrypting the protected resource under the second cryptographic key, wherein the second cryptographic key is read from the first cryptographic device subsequent to authenticating to the first cryptographic device by (i) reading all of the one or more modified sub-keys associated with the second cryptographic key from the first cryptographic device and (ii) matching all of the one or more sub-keys associated with the second cryptographic key to one or more maintained sub-keys.

2. The method of claim 1, wherein the first cryptographic key comprises a first secret key shared between the first cryptographic device and a second cryptographic device, and the second cryptographic key comprises a second secret key shared between the first cryptographic device and the second cryptographic device.

3. The method of claim 1, wherein:
the one or more sub-keys associated with the first cryptographic key comprises a first password; and
the one or more modified sub-keys associated with the second cryptographic key comprises a second password.

4. The method of claim 1, wherein the protected resource is stored on a second cryptographic device, wherein the second cryptographic device comprises a mobile device, and wherein the protected resource comprises at least one of a password, a decryption key and an authentication key.

5. An article of manufacture comprising a processor-readable storage memory having processor-readable instructions tangibly embodied thereon which, when implemented, cause a processor to carry out steps comprising:
decrypting encoded information under a first cryptographic key from a collection of multiple cryptographic keys on a first cryptographic device to access a protected resource, wherein the first cryptographic device comprises one of a radio-frequency identification tag and a near-field communication tag, wherein each cryptographic key in the collection is associated with one or more sub-keys, and wherein the first cryptographic key is read from the first cryptographic device subsequent to authenticating to the first cryptographic device by (i) reading all of the one or more sub-keys associated with the first cryptographic key from the first cryptographic device and (ii) matching all of the one or more sub-keys associated with the first cryptographic key to one or more maintained sub-keys;
rendering null all of the one or more sub-keys associated with the first cryptographic key;
erasing the first cryptographic key;
transmitting, to the first cryptographic device, a command to modify each of the one or more sub-keys associated with each remaining cryptographic key in the collection of cryptographic keys;
selecting a second cryptographic key from the collection of multiple cryptographic keys on the first cryptographic device; and
encrypting the protected resource under the second cryptographic key, wherein the second cryptographic key is read from the first cryptographic device subsequent to authenticating to the first cryptographic device by (i) reading all of the one or more modified sub-keys associated with the second cryptographic key from the first cryptographic device and (ii) matching all of the one or more sub-keys associated with the second cryptographic key to one or more maintained sub-keys.

6. A method comprising:
selecting a first cryptographic key from a first set of cryptographic keys on a first cryptographic device, wherein each cryptographic key in the first set includes one or more sub-keys, and wherein the first cryptographic device comprises one of a radio-frequency identification tag and a near-field communication tag;
decrypting encoded information under the first cryptographic key to access a protected resource, wherein said decrypting comprises receiving the selected first cryptographic key from the first cryptographic device subsequent to authenticating to the first cryptographic device by (i) reading all of the one or more sub-keys included with the first cryptographic key from the first cryptographic device and (ii) matching all of the one or more sub-keys included with the first cryptographic key to one or more maintained sub-keys;
rendering null all of the one or more sub-keys included with the first cryptographic key, thereby rendering the number of unused sub-keys included in the first set of cryptographic keys, excluding the first cryptographic key, to be in a range from 1 to $e-1$, wherein e represents the number of cryptographic keys in the first set of cryptographic keys;
generating an additional sub-key to be included in each respective cryptographic key of the first set of cryptographic keys, thereby rendering the number of unused sub-keys included in the first set of cryptographic keys to be in a range from 1 to e;
transmitting the generated set of sub-keys to the first cryptographic device;
selecting a second cryptographic key from the first set of cryptographic keys, said second cryptographic key including at least one sub-key from the generated sub-keys and at least one pre-existing sub-key; and
encrypting the protected resource under the second cryptographic key and/or a key related to the second cryptographic key, wherein said encrypting comprises receiving the selected second cryptographic key from the first cryptographic device subsequent to authenticating to the first cryptographic device by (i) reading all of the two or more sub-keys included with the second cryptographic key from the first cryptographic device and (ii) matching all of the two or more sub-keys included with the second cryptographic key to two or more maintained sub-keys.

7. The method of claim 6, wherein a key related to the second cryptographic key comprises a public key that corresponds to the second cryptographic key, wherein the second cryptographic key is a private key.

8. The method of claim 6, wherein the first set of cryptographic keys comprises a set of multiple secret keys shared between the first cryptographic device and a second cryptographic device.

9. The method of claim 6, wherein the first cryptographic device aggregates multiple sub-keys.

10. The method of claim 6, further comprising:
locally storing the generated sub-keys, and wherein each sub-key is used in only one operation of encryption or decryption.

11. The method of claim 6, further comprising:
randomizing the generated sub-keys.

12. An article of manufacture comprising a processor-readable storage memory having processor-readable instructions tangibly embodied thereon which, when implemented, cause a processor to carry out steps comprising:
selecting a first cryptographic key from a first set of cryptographic keys on a first cryptographic device, wherein each cryptographic key in the first set includes one or more sub-keys, and wherein the first cryptographic device comprises one of a radio-frequency identification tag and a near-field communication tag;
decrypting encoded information under the first cryptographic key to access a protected resource, wherein said decrypting comprises receiving the selected first cryptographic key from the first cryptographic device subsequent to authenticating to the first cryptographic device by (i) reading all of the one or more sub-keys included with the first cryptographic key from the first cryptographic device and (ii) matching all of the one or more sub-keys included with the first cryptographic key to one or more maintained sub-keys;

rendering null all of the one or more sub-keys included with the first cryptographic key, thereby rendering the number of unused sub-keys included in the first set of cryptographic keys, excluding the first cryptographic key, to be in a range from 1 to e−1, wherein e represents the number of cryptographic keys in the first set of cryptographic keys;

generating an additional sub-key to be included in each respective cryptographic key of the first set of cryptographic keys, thereby rendering the number of unused sub-keys included in the first set of cryptographic keys to be in a range from 1 to e;

transmitting the generated sub-keys to the first cryptographic device;

selecting a second cryptographic key from the first set of cryptographic keys, said second cryptographic key including at least one sub-key from the generated sub-keys and at least one pre-existing sub-key; and encrypting the protected resource under the second cryptographic key and/or a key related to the second cryptographic key, wherein said encrypting comprises receiving the selected second cryptographic key from the first cryptographic device subsequent to authenticating to the first cryptographic device by (i) reading all of the two or more sub-keys included with the second cryptographic key from the first cryptographic device and (ii) matching all of the two or more sub-keys included with the second cryptographic key to two or more maintained sub-keys.

13. An apparatus comprising a cryptographic device, comprising:

a memory; and at least one processor coupled to the memory and configured to:

decrypt encoded information under a first cryptographic key from a collection of multiple cryptographic keys on a first cryptographic device to access a protected resource, wherein the first cryptographic device comprises one of a radio-frequency identification tag and a near-field communication tag, wherein each cryptographic key in the collection is associated with one or more sub-keys, and wherein the first cryptographic key is read from the first cryptographic device subsequent to authenticating to the first cryptographic device by (i) reading all of the one or more sub-keys associated with the first cryptographic key from the first cryptographic device and (ii) matching all of the one or more sub-keys associated with the first cryptographic key to one or more maintained sub-keys;

render null all of the one or more sub-keys associated with the first cryptographic key;

erase the first cryptographic key;

transmit, to the first cryptographic device, a command to modify each of the one or more sub-keys associated with each remaining cryptographic key in the collection of cryptographic keys;

select a second cryptographic key from the collection of multiple cryptographic keys on the first cryptographic device; and encrypt the protected resource under the second cryptographic key, wherein the second cryptographic key is read from the first cryptographic device subsequent to authenticating to the first cryptographic device by (i) reading all of the one or more modified sub-keys associated with the second cryptographic key from the first cryptographic device and (ii) matching all of the one or more sub-keys associated with the second cryptographic key to one or more maintained sub-keys.

14. An apparatus comprising a cryptographic device, comprising:

a memory; and at least one processor coupled to the memory and configured to:

select a first cryptographic key from a first set of cryptographic keys on a first cryptographic device, wherein each cryptographic key in the first set includes one or more sub-keys, and wherein the first cryptographic device comprises one of a radio-frequency identification tag and a near-field communication tag;

decrypt encoded information under the first cryptographic key to access a protected resource, wherein said decrypting comprises receiving the selected first cryptographic key from the first cryptographic device subsequent to authenticating to the first cryptographic device by (i) reading all of the one or more sub-keys included with the first cryptographic key from the first cryptographic device and (ii) matching all of the one or more sub-keys included with the first cryptographic key to one or more maintained sub-keys;

render null all of the one or more sub-keys included with the first cryptographic key, thereby rendering the number of unused sub-keys included in the first set of cryptographic keys, excluding the first cryptographic key, to be in a range from 1 to e−1, wherein e represents the number of cryptographic keys in the first set of cryptographic keys;

generate an additional sub-key to be included in each respective cryptographic key of the first set of cryptographic keys, thereby rendering the number of unused sub-keys included in the first set of cryptographic keys to be in a range from 1 to e;

transmit the generated sub-keys to the first cryptographic device;

select a second cryptographic key from the first set of cryptographic keys, said second cryptographic key including at least one sub-key from the generated set of sub-keys and at least one pre-existing sub-key; and encrypt the protected resource under the second cryptographic key and/or a key related to the second cryptographic key, wherein said encrypting comprises receiving the selected second cryptographic key from the first cryptographic device subsequent to authenticating to the first cryptographic device by (i) reading all of the two or more sub-keys included with the second cryptographic key from the first cryptographic device and (ii) matching all of the two or more sub-keys included with the second cryptographic key to two or more maintained sub-keys.

15. The apparatus of claim 13, wherein the first cryptographic key comprises a first secret key shared between the first cryptographic device and a second cryptographic device, and the second cryptographic key comprises a second secret key shared between the first cryptographic device and the second cryptographic device.

16. The apparatus of claim 13, wherein:

the one or more sub-keys associated with the first cryptographic key comprises a first password; and the one or more modified sub-keys associated with the second cryptographic key comprises a second password.

17. The apparatus of claim 13, wherein the protected resource is stored on a second cryptographic device, wherein the second cryptographic device comprises a mobile device, and wherein the protected resource comprises at least one of a password, a decryption key and an authentication key.

18. The apparatus of claim 14, wherein a key related to the second cryptographic key comprises a public key that corresponds to the second cryptographic key, wherein the second cryptographic key is a private key.

19. The apparatus of claim 14, wherein the first set of cryptographic keys comprises a set of multiple secret keys shared between the first cryptographic device and a second cryptographic device.

20. The apparatus of claim 14, wherein the at least one processor is further configured to:
    locally store the generated sub-keys, and wherein each sub-key is used in only one operation of encryption or decryption.

\* \* \* \* \*